US012056686B2

(12) United States Patent
Pinski

(10) Patent No.: US 12,056,686 B2
(45) Date of Patent: *Aug. 6, 2024

(54) SYSTEM AND METHOD FOR PROVIDING A USER-LOADABLE STORED VALUE CARD

(71) Applicant: Capital One Services, LLC, McLean, VA (US)

(72) Inventor: David Aaron Pinski, Narberth, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 322 days.

This patent is subject to a terminal disclaimer.

(21) Appl. No.: 17/530,508

(22) Filed: Nov. 19, 2021

(65) Prior Publication Data

US 2022/0076243 A1 Mar. 10, 2022

Related U.S. Application Data

(63) Continuation of application No. 16/244,300, filed on Jan. 10, 2019, now Pat. No. 11,210,655, which is a continuation of application No. 15/663,278, filed on Jul. 28, 2017, now Pat. No. 10,540,650, which is a continuation of application No. 14/191,994, filed on Feb. 27, 2014, now Pat. No. 9,754,252.

(60) Provisional application No. 61/769,844, filed on Feb. 27, 2013.

(51) Int. Cl.
G06Q 20/34 (2012.01)
G06Q 20/10 (2012.01)
G06Q 20/28 (2012.01)

(52) U.S. Cl.
CPC ......... *G06Q 20/354* (2013.01); *G06Q 20/105* (2013.01); *G06Q 20/28* (2013.01); *G06Q 20/342* (2013.01); *G06Q 20/349* (2013.01)

(58) Field of Classification Search
CPC .................................................. G06Q 20/354
See application file for complete search history.

(56) References Cited

U.S. PATENT DOCUMENTS

| 7,437,328 | B2 * | 10/2008 | Graves | G06Q 20/105 |
|---|---|---|---|---|
| | | | | 705/40 |
| 2005/0076218 | A1 * | 4/2005 | Brown | H04L 9/3263 |
| | | | | 705/14.34 |
| 2006/0261150 | A1 * | 11/2006 | Seifert | G06Q 30/06 |
| | | | | 235/379 |
| 2008/0006685 | A1 * | 1/2008 | Rackley, III | G06Q 40/00 |
| | | | | 235/379 |

\* cited by examiner

*Primary Examiner* — Edward Chang
(74) *Attorney, Agent, or Firm* — TROUTMAN PEPPER HAMILTON SANDERS LLP; Christopher J. Forstner; John A. Morrissett

(57) ABSTRACT

A system and method in accordance with example embodiments may provide a user-loadable stored value card. Additionally, a system and method in accordance with example embodiments may allow an institution to receive a user-loadable stored value card activation request from a sender, activate a user-loadable stored value card using the information received in the activation request, and provide card management capabilities to the sender.

20 Claims, 5 Drawing Sheets

SYSTEM AND METHOD FOR PROVIDING A USER-LOADABLE STORED VALUE CARD

CROSS-REFERENCE TO RELATED APPLICATIONS

This application is a continuation of, and claims priority under 35 U.S.C. § 120 to U.S. patent application Ser. No. 16/244,300, filed Jan. 10, 2019, which is a continuation of U.S. patent application Ser. No. 15/663,278, now U.S. Pat. No. 10,540,650, filed on Jul. 28, 2017, which is a continuation of U.S. patent application Ser. No. 14/191,994, now U.S. Pat. No. 9,754,252, filed Feb. 27, 2014, which claims priority to U.S. Provisional Patent Application No. 61/769,844, filed on Feb. 27, 2013, the entire contents of which are fully incorporated herein by reference.

FIELD OF THE DISCLOSURE

The present disclosure relates to systems and methods for providing a user-loadable stored value card.

BACKGROUND OF THE DISCLOSURE

Stored-value cards currently are either pre-loaded and activated by an issuer or an issuer's agent, or loaded at the time of issuance/purchase by an issuer or an issuer's agent. Typically, these cards can be redeemed for merchandise at a specific merchant, utilized on a credit card network, or loaded to a proprietary network.

The purchaser of the card has no control over the card once it leaves their possession. For this reason, control of fraud, and potential escheatment are difficult to manage. It also is difficult to know if the recipient of the card has used the card.

These and other drawbacks exist.

SUMMARY OF THE DISCLOSURE

Various embodiments provide systems and methods for activating and redeeming a user-loadable stored value card. The system includes one or more computer processors that receives, via a network, a user-loadable stored value card activation request from a sender, an institution database that stores information about the user-loadable stored value card associated with the activation request, a processor that activates the user-loadable stored value card using the information received in the activation request, and a management module that provides card management capabilities to the sender.

The method includes receiving, via a network, a user-loadable stored value card activation request from a sender, storing information about the user-loadable stored value card associated with the activation request in a institution database, activating the user-loadable stored value card using the information received in the activation request, and providing card management capabilities to the sender.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
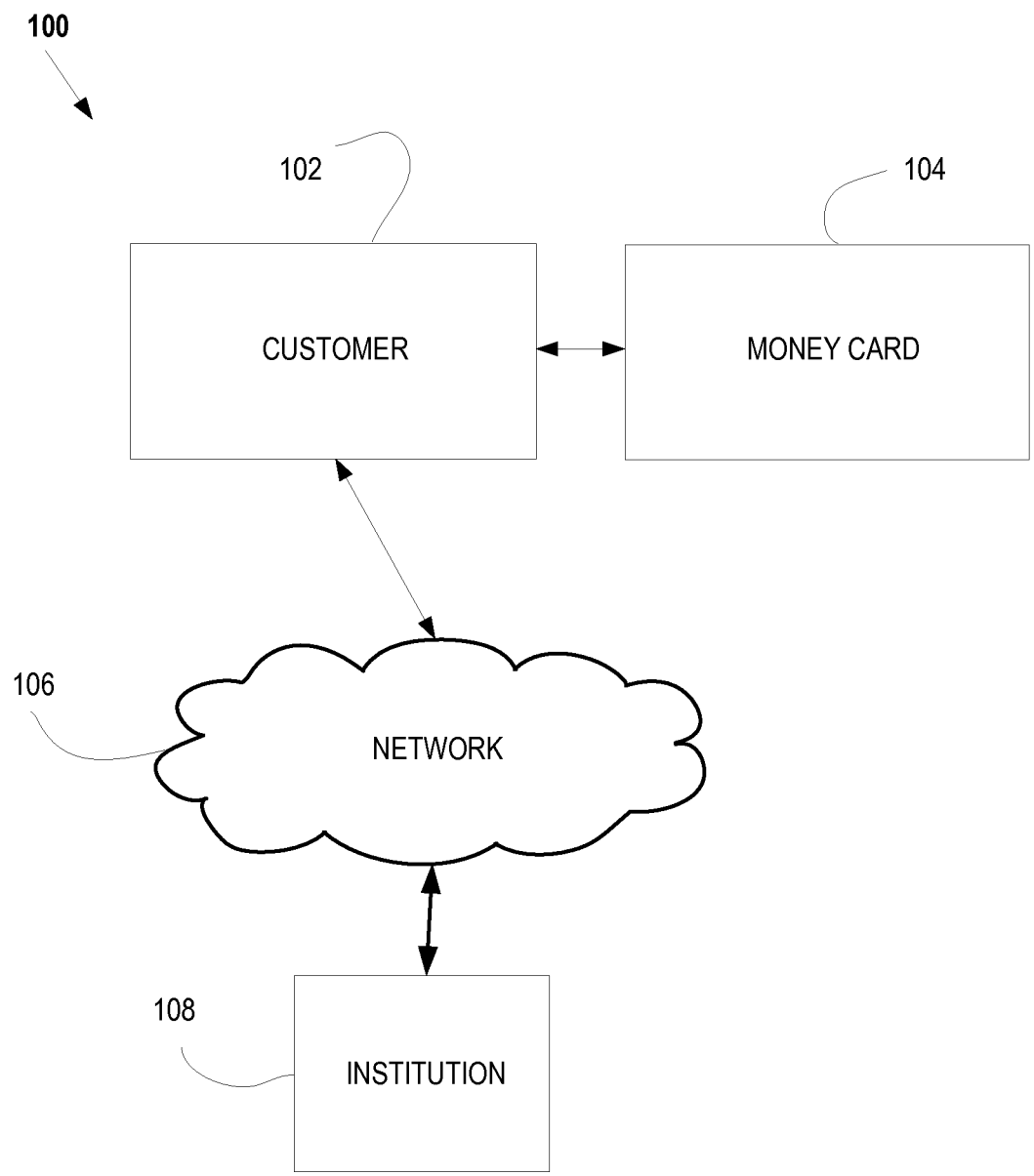
FIG. 1 depicts an example embodiment of a system implementing a user-loadable stored value card according to an example embodiment.

The following description is intended to convey a thorough understanding of the embodiments described by providing a number of specific example embodiments and details involving systems and methods for providing a user-loadable stored value card. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods enable a user-loadable stored value card. A user-loadable stored-value card may contain funds that can be claimed by a second individual and deposited into an institution account by direct transfer or ACH. For example and not by way of limitation, the initiator and/or purchaser of the card may be permitted to self-manage the value and security associated with the card to manage fraud, escheatment, and other funding issues. Also, predefined paired keys may be used to manage the relationship between the initiator of the transaction and the recipient of the card. These keys may be represented by an alphanumeric code, bar code, QR code or a similar machine readable format.

In an example embodiment, systems and methods may be provided using paired keys to manage the behaviors between a sender and a recipient of the card. For example and not by way of limitation, each half of a loadable card may contain an obscured key. A sender may reveal the key, log onto their institution account and select to load the card. The sender may enter or scan the key and the amount of money to be loaded to the card. The sender will then deliver a recipient half of the card to a designated individual. The recipient of the card will go to a website of the institution which is publicly available. The recipient will reveal the key on their half of the card. The recipient will enter or scan their key into the website, along with their institution routing number and account number. By utilizing a QR code or similar technology, the URL for the recipient to pick up the funds may be combined with their unique pickup key to allow a one-click pickup initiation from a smartphone. Recipients will then provide their account routing information through manual entry or image capture of a personal check, credit card or debit card. Funds will be sent to the recipient account via ACH or card association channels.

In an example embodiment, the card may be safeguarded by additional security measures. For additional security, the sender may define a second password or key that may be delivered to the recipient through a second, alternate channel. The delivery mechanism may be verbal, in person of via phone, email, SMS, website, or any other mechanism.

In an example embodiment, the systems and methods may provide for consumer control of stored-value cards. For example and not by way of limitation, the institution may leverage the paired keys of the cards, which may allow the institution to understand the otherwise anonymous relationship between the send and recipient of a card. Prior to the card being deposited and funds transferred, the originator may be permitted to cancel the card and request the funds be returned to their account. When a request for deposit of the card has occurred, the sender may be notified via email, SMS, or other communication method of the pick-up and who is picking it up. They will be able to stop the final transfer of funds prior to the ACH file being generated.

In an example embodiment, the user-loadable stored value card may function as a medium to transfer funds to a second party. Also, the user-loadable stored value card may be capable of functioning independent of Check 21 systems or in clearing requirements. The user-loadable stored value card may function as a physical component to enable a peer to peer funding transaction. For example, the user-loadable stored value card may not require exchange of any personal data between parties.

In an example embodiment, a sender may activate a card. For example, the sender may scratch off a card activation code and enter or scan the code into an institution web site. The sender may define an amount, an optional passphrase, and an optional note. The sender may then optionally fill out the card or a portion of the card before providing the card to recipient. In an example embodiment, a recipient may desire to redeem a user-loadable stored value card. For example, a recipient may visit a web site associated with the institution to redeem the card. A recipient may first scratch off pickup key and provide the key to an institution or other third party. The recipient may also enter the optional passphrase. Upon entry and submission of the relevant information, the recipient may be permitted to deposit the card, optionally using existing peer to peer payment systems to process the deposit.

In an example embodiment, the physical card may be a single card, or a card which may be separated into two parts. The card may provide space for branding messages. For example, an institution may produce multiple versions of cards—(e.g. "gift", "check", "money"), vary images, give out pre-loaded cards for promotions, provide referral bonuses, etc.

In an example embodiment, the user-loadable stored value card may leverage existing peer to peer transaction infrastructure, with additional mechanism to activate and load funds onto cards and infrastructure to create and manage card keys. The institution may also provide a public web site for card pickup and/or redemption. Additionally, an institution may optionally create mobile interface to load and activate cards. For example, mobile interface could be compatible with an iPhone, iPod, iPad from Apple® or any other mobile device running Apple's iOS operating system, any device running Google's Android® operating system, any device running Microsoft's Windows® Mobile operating system, and/or any other smartphone or like device.

In an example embodiment, an institution may limit a user-loadable stored value card value. Additionally, the sender or other party may activate, cancel, or otherwise restrict a card, and may optionally do so even after issuance. Additionally, the institution may stop the funds transfer through normal procedures. Also, the system may require that a party attempting to redeem a user-loadable stored value card to have access to both physical cards and the institution's system. Also, the sender may add a passphrase for added security.

FIG. 1 depicts an example system 100 for use with a user-loadable stored value card. System 100 may include a customer 102, user-loadable stored value card 104, a network 106, and an institution 108. One or more customers 102 may be in communication with the system. The customer may desire to provide funds to another party. The customer 102 may obtain a user-loadable stored value card 104, which the customer may activate through the institution 108 via a network 106.

Network 106 may enable communication between an institution 108 and one or more customers 102. For example, Network 106 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 106 may include, without limitation, telephone lines, fiber optics, IEEE Ethernet 902.3, a wide area network ("WAN"), a local area network ("LAN"), or a global network such as the Internet. Also network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more embodiments, network 106 may comprise a plurality of interconnected networks, such as, for example, the Internet, a service provider's network, a cable television network, corporate networks, and home networks.

Figure 2:
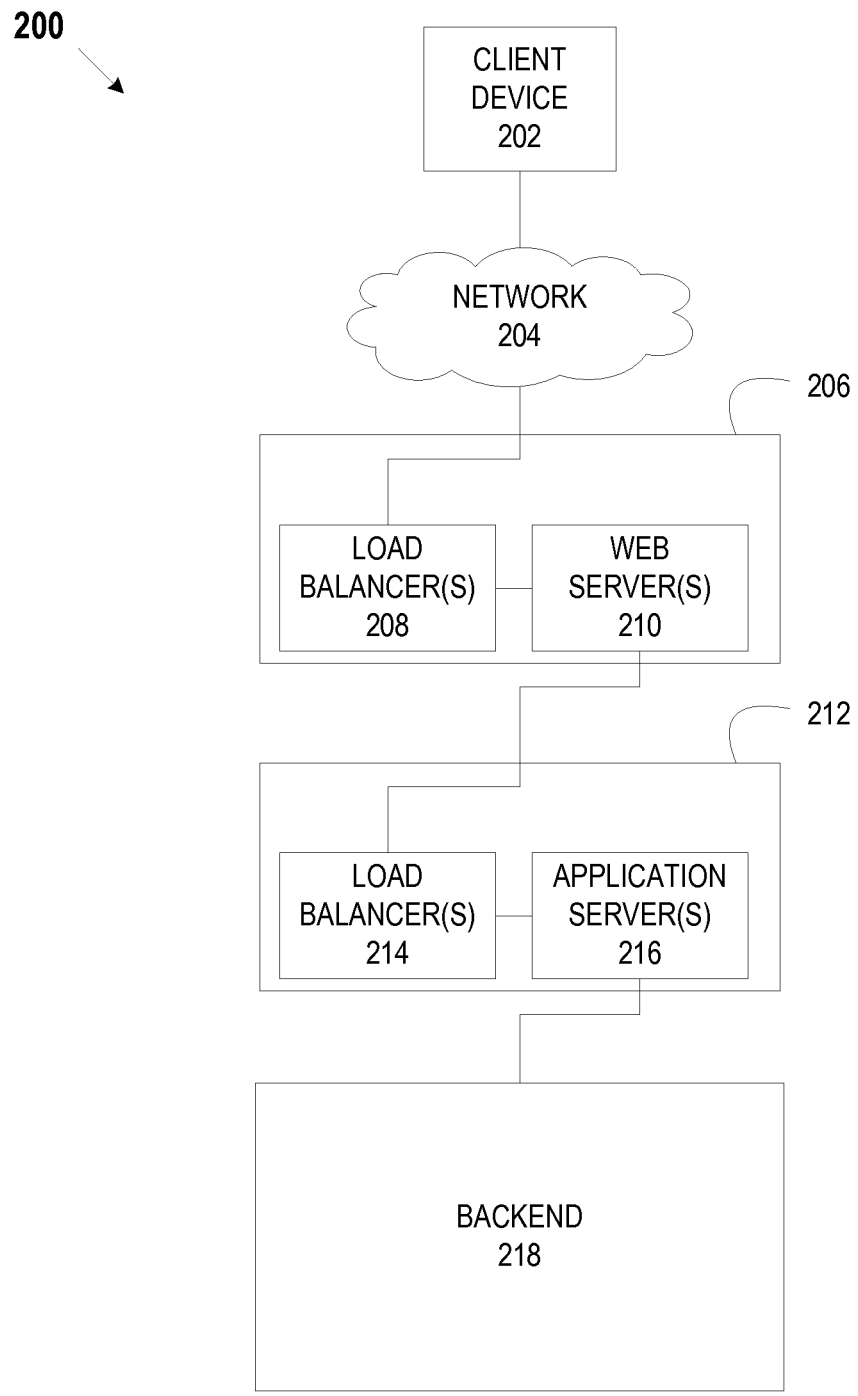
FIG. 2 depicts an example embodiments of a system providing network services according to an example embodiment.

FIG. 2 depicts an example system 200 that may enable an institution, for example, to provide network services to its customers. For example, system 200 may enable a financial institution to provide user-loadable stored value cards as described herein. System 200 also may enable senders and recipients to manage user-loadable stored value cards. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDOS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device A 02) through a network (e.g., network 204), such as the Internet. In various examples, web servers, may deliver web pages, relating to, for example, 0
online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content. A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device A02 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 218 may be associated with various databases, including account databases that maintain, for example, customer account information, stored value card information including keys and passphrases associated with user-loaded stored value cards, content databases that store content associated with, for example, a financial institution, and the like. Backend 218 also may enable key management and deposits associated with user-loaded stored value cards as described herein. Backend 218 also may be associated with one or more servers that enable the various services provided by system 200.

Figure 3:
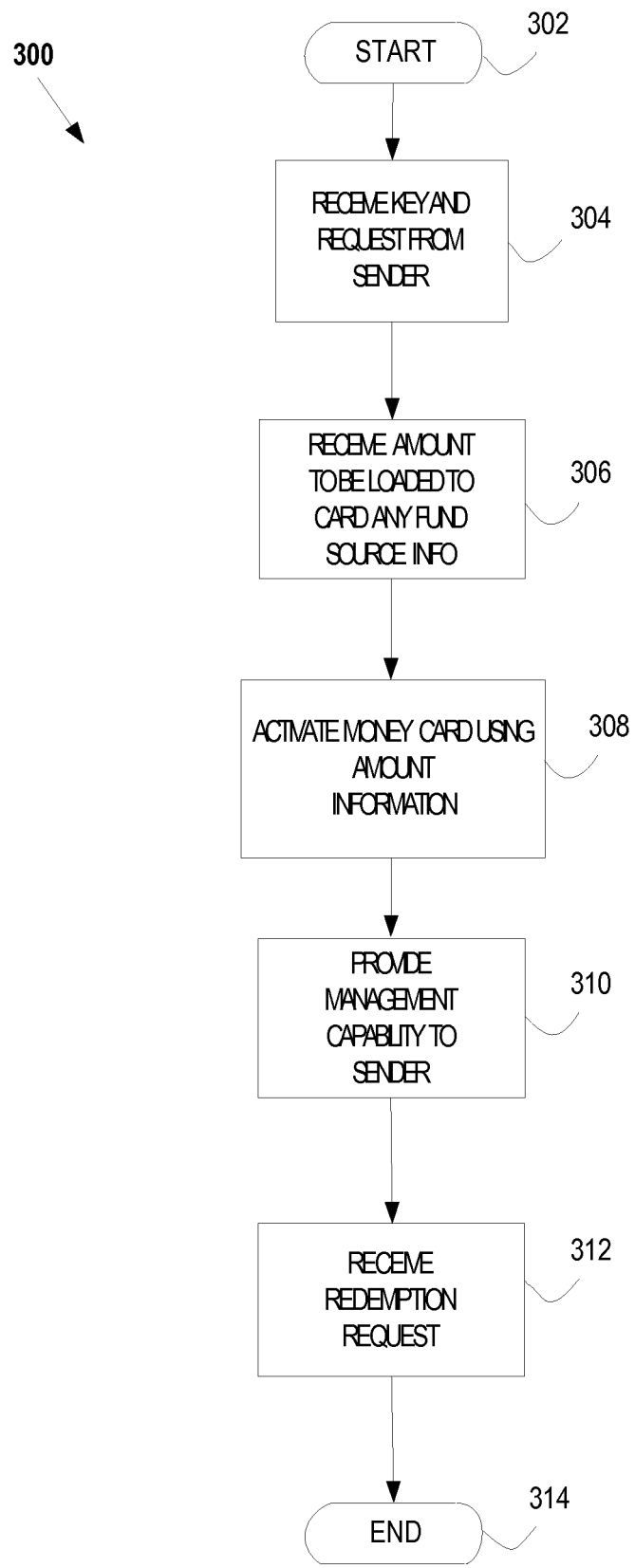
FIG. 3 depicts an example embodiment of a method utilizing a user-loadable stored value card according to an example embodiment.

FIG. 3 provides a method for implementing a user-loadable stored value card. At step 302, the method may start. At step 304, the institution may receive a secret key and a card activation request from a sender. The activation request may optionally contain all information necessary to further process the transaction, including amount, key and passphrase information. The activation request may be received via, for example, a network whereby the sender inputs activation request information into a web page and/or native mobile application associated with the institution.

At step 306, the institution may receive an amount to be loaded onto the user-loadable stored value card and fund source information. For example, the fund source information may represent a customer's choice of payment account. The amount information and fund source information also may be received via, for example, the network whereby the sender inputs the information into a web page and/or native mobile application associated with the institution.

At step 308, the institution may activate the user-loadable stored value card. In activating the user-loadable stored value card, the institution may save the received information in a database associated with the institution. The institution also may notify the sender, via a network, that the user-loaded stored value card has been activated. For example, the institution may send an email, a message (e.g., a text message, push notification, and the like) and/or provide a notification via the web page and/or native application.

At step 310, the institution may provide management capability to a sender. For example, the institution may provide to the sender the option to cancel the card and request the funds be returned to their account. These management capabilities may be provided over a network via an interface such as a web page and/or native application that allows the sender to log in to an account associated with the user-loaded stored value card and manage various aspects of the user-loaded stored value card.

At step 312, the institution may receive a redemption request via a computer network. For example, the institution may receive a request from the card recipient to redeem the card, including the key and optionally, the passphrase. Upon receipt of the and any other relevant information, the institution may permit the recipient to deposit the card, optionally using existing peer to peer payment systems to process the deposit. The institution also may receive a redemption request from an authorization network as described below with respect to FIG. 5. In various embodiments, the key and passphrase may be sent as, for example, Track 3 data. The key and passphrase also may be sent via a mobile device associated with the recipient at the time of the redemption request. For example, the institution may receive a request from the card recipient to redeem the card via an authorization network, then transmit a prompt to a mobile device of the recipient for the key and passphrase, receive the key and passphrase from the recipient, and then authorize the transaction.

Figure 4:
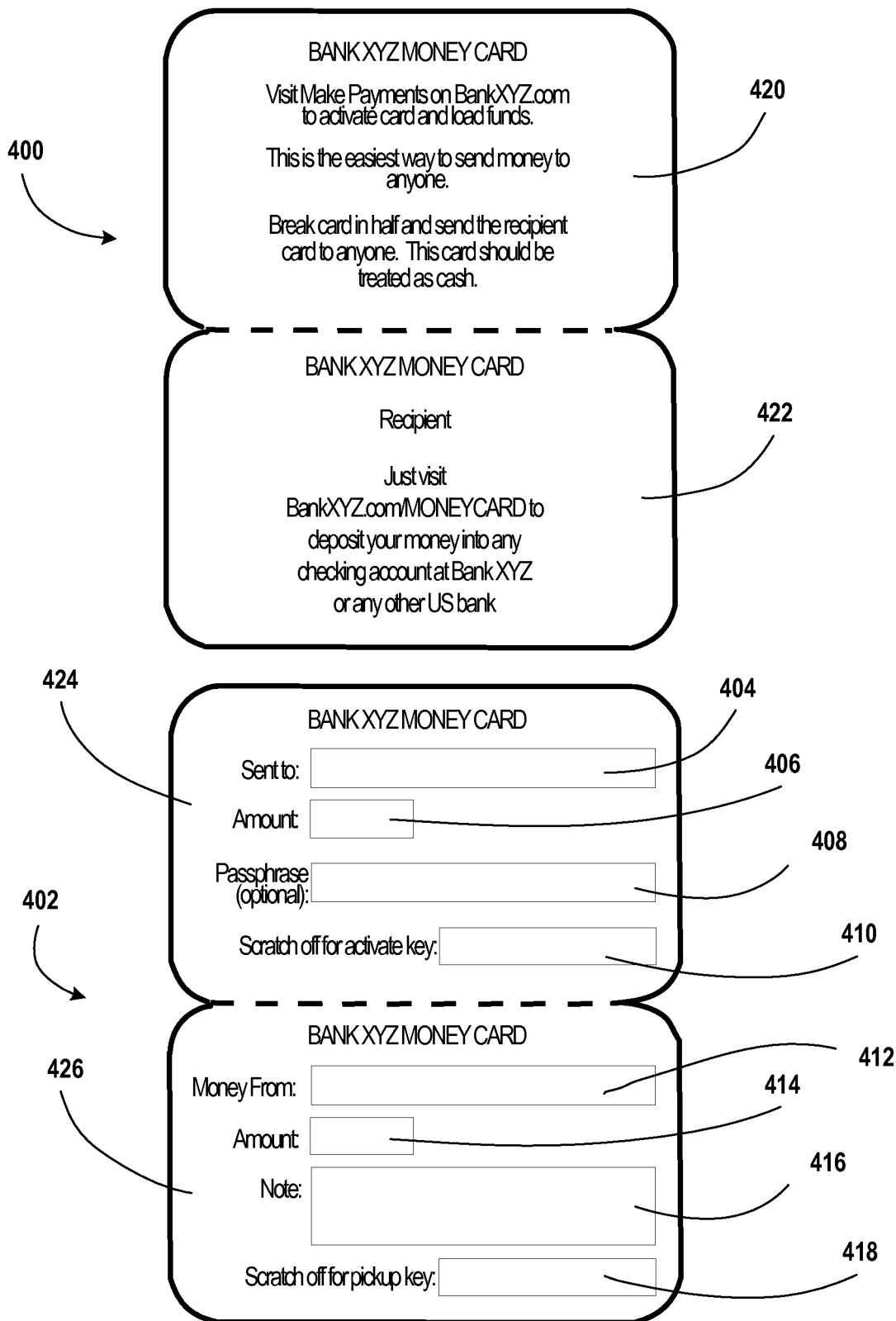
FIG. 4 depicts an example embodiment of a user-loadable stored value card according to an example embodiment.

FIG. 4 illustrates an embodiment of the user-loadable stored value card. The user-loadable stored value card may have a front side 400 and a back side 402. Front side 400 may have a top half 420 and a bottom half 422. Top half 420 may provide instructions to a potential sender. Bottom half 422 may provide instructions to the recipient of a card.

Back side 402 may have a top half 424 and a bottom half 426. Top half 424 may contain a sent to field 404. The sender may enter the name or other identifying information of the recipient of the card. Top half 424 may contain an amount field 406. The sender may enter the desired amount to send in amount field 406. Top half 424 may contain an optional passphrase field 408. A sender may enter an optional passphrase into optional passphrase field 408. The optional passphrase may be, for example and not by way of limitation, an alphanumeric code that sender may communicate to receiver verbally or via one or more computers. Top half 424 may contain a key field 410. Key field 410 may contain a secret key covered with a scratch off coating.

Figure 5:
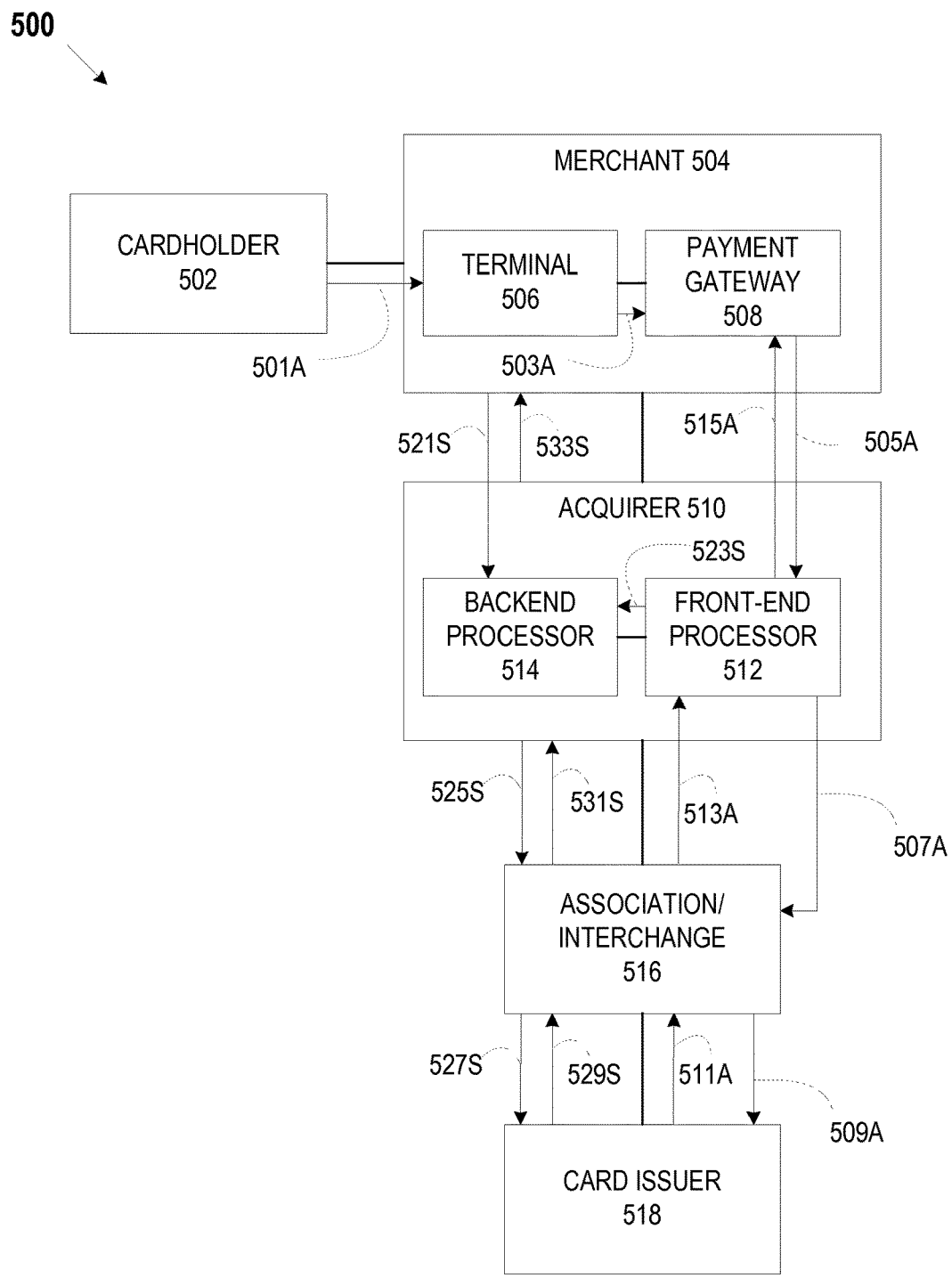
FIG. 5 depicts an example stored value card network according to an example embodiment.

Bottom half 426 may contain a from field 412. The from field 412 may contain the name of the sender or other party responsible for the funds. Bottom half 426 may contain an amount field 414. Amount field 414 may contain the amount of funds sent by the sender. Bottom half 426 may contain a note field 416. The note field 416 may contain an optional message entered by the sender (e.g. "Happy Birthday" or "July rent payment"). Bottom half 426 may contain a key field 418. Key field 418 may contain a secret key represented as an alphanumeric code, barcode, QR code or similar machine readable format covered with a scratch off coating.
FIG. 5 illustrates an example system 500 and method for card authorization. In various embodiments, system 500 may enable recipients to redeem value from a user-loaded stored value card at, for example, a merchant. In various embodiments using system 500, the keys and passphrases described herein may be transmitted as, for example, track 3 data within an authorization network. As shown and described in Figure D, merchants, cardholders and financial institutions may be connected with a card association network to enable secure transactions and timely payments.

System 500 may include a cardholder 502, merchant 504, Acquirer 510, Association/Interchange 516, and card issuer 518.

Cardholder 502 may be any card holder, including a credit card holder, debit card holder, stored value card holder and the like. Cardholder 502 may possess a plastic card or carry a device (e.g., a mobile device) that securely stores card credentials and is capable of transmitting the card credentials to, for example, a PoS terminal (e.g., terminal 506). Cardholder 502 may interact with a merchant (e.g., merchant 504) by presenting a card or card credentials to a terminal (e.g., terminal 506).

Merchant 504 may be any merchant that accepts payment from a cardholder, for example. Merchant 504 may be any retailer, service provider, business entity, or individual that accepts payments. Merchant 504 may include software, firmware and hardware for accepting and/or processing payments. For example, as illustrated in Figure D, merchant 504 may include a terminal 506 and a payment gateway 508. Terminal 506 and payment gateway 508 may comprise the physical or virtual device(s) used by merchant 504 to communicate information to front-end processor 512 of acquirer 510. Terminal 506 may be similar to POS system [Y00] as shown and described in Figure Y. In various embodiments, payment gateway 508 may be an e-commerce application service provider service that authorizes payments for merchants. As such, payment gateway 508 may be a virtual equivalent of a PoS terminal and interface with, for example, a billing system of merchant 504 and pass data to front-end processor 512 of acquirer 510.

Acquirer 510 may be, for example, a financial institution or bank, that holds the contract for providing payment processing services to merchant 504. Merchant 504 may have a merchant account that may serve as a contract under which Acquirer 510 may extend a line of credit to a merchant who wishes to accept, for example, credit card transactions. As shown in Figure D, Acquirer 510 may be associated with front-end processor 512 and back-end processor 514.

In various examples, front-end processor 512 may be a platform that card terminal 506 and/or payment gateway 508 communicate with when approving a transaction. Front-end processor 512 may include hardware, firmware, and software to process transactions. Front-end processor 512 may be responsible for the authorization and capture portion of credit card transaction. Front-end processor 512 also may include additional front-end platform interconnections to support, for example, ACH and debit transactions.

Backend processor 514 may be a platform that takes captured transactions from front-end processor 512 and settles them through an Interchange system (e.g., association/interchange 516). Back-end processor 514 may generate, for example, daily ACH files for merchant settlement. Back-end processor 514 also may handle chargeback handling, retrieval request and monthly statements.

Association/interchange 516 may be the consumer payment system whose members are the financial institutions that issue payment cards and/or sign merchant to accept payment cards. Example associations/interchanges 516 may include, Visa®, MasterCard®, and AmericanExpress®. Association/interchange 516 may include one or more computer systems and networks to process transactions.

Issuer 518 may be a financial institution that issues payment cards and maintains a contract with cardholders for repayment. In various embodiments, issuer 518 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 502 may present payment card as payment (501A) at merchant 504 PoS terminal 506, for example. Merchant 504 may enter card into a physical PoS terminal 506 or submit a credit card transaction to a payment gateway 508 on behalf of cardholder 502 via secure connection from a Web site, retail location, or a wireless device.

Payment gateway 508 may receive the secure transaction information (503A) and may pass the secure transaction information (505A) via a secure connection to the merchant acquirer's 510 front-end processor 512.

Front-end processor 512 may submit the transaction (507A) to association/interchange 516 (e.g., a network of financial entities that communicate to manage the processing, clearing and settlement of credit card transactions). Association/interchange 516 may route the transaction (509A) to the customer's Issuer 518. Issuer 518 may approve or decline the transaction and passes the transaction results back (511A) through association/interchange 516. Association/interchange then may relay the transaction results (513A) to front-end processor 512.

Front-end processor 512 may relay the transaction results (515A) back to the payment gateway 508 and/or terminal 506. Payment gateway 508 may store the transaction results and sends them to merchant 504. Merchant 504 may receive the authorization response and complete the transaction accordingly.

During settlement, merchant 504 may deposit the transaction receipt (521S) with acquirer 510 via, for example, a settlement batch. Captured authorizations may be passed (523S) from front-end processor 512 to the back-end processor 514 for settlement. Back-end processor may generates ACH files for merchant settlement. Acquirer may submit settlement files (525S, 527S) to Issuer 518 for reimbursement via association/interchange 516. Issuer 518 may post the transaction and pay merchant 504 (529S, 531S, 533S).

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A system comprising:
one or more computer processors; and
a memory in communication with the one or more processors and storing instructions that, when executed by the one or more processors, are configured to cause the system to:
receive, from a sender, a load request for an amount of money to be loaded onto a user-loadable stored value card, the load request comprising a unique sender key associated with the user-loadable stored value card, identifying information of a recipient, and a passphrase defined by the sender;
load the user-loadable stored value card with the amount of money based on the load request based on the unique sender key;
receive, from the recipient, an activation request to redeem the user-loadable stored value card, the activation request comprising a unique recipient key associated with the user-loadable stored value card and the passphrase defined by the sender, wherein the unique recipient key is different from, but paired to, the unique sender key, and wherein the unique recipient key and the unique sender key respectively form first and second portions of a first key; and
process the activation request to automatically activate the user-loadable stored value card based on determining that the unique recipient key is paired with the unique sender key and the passphrase received in the load request is the same as the passphrase received in the activation request.

2. The system of claim 1, wherein the load request is transmitted by the sender directly to a financial service provider associated with the one or more computer processors.

3. The system of claim 1, wherein the sender is an account holder with a financial service provider.

4. The system of claim 1, wherein the unique recipient key is represented by a QR code.

5. The system of claim 1, wherein the user-loadable stored value card comprises a first sender part and a second recipient part, wherein the first sender part is detachable from the second recipient part, and wherein the first sender part comprises the unique sender key associated with the load request, and the second recipient part comprises the unique recipient key associated with the activation request.

6. The system of claim 1, wherein the user-loadable stored value card has no associated value before it is loaded.

7. The system of claim 1, wherein the unique sender key is represented by a QR code.

8. The system of claim 1, wherein the unique sender key and the unique recipient key are concealed by a scratch off coating.

9. The system of claim 1, wherein the amount of money loaded on the user-loadable stored value card is revocable by the sender and when the amount of money is revoked by the sender, the amount of money is transmitted to a sender fund source associated with the sender.

10. A method, comprising:
receiving, by one or more computer processors, a load request for an amount of money to be loaded onto a user-loadable stored value card from a sender fund source associated with a sender, the load request comprising a sender key associated with the user-loadable stored value card, a sender-defined passphrase, and identifying information of a recipient;
loading, by the one or more computer processors, the user-loadable stored value card with the amount of money based on the load request by enabling a funds transfer from the sender fund source based on the sender key;
receiving, via a user device associated with the recipient, an activation request to redeem the user-loadable stored value card, the activation request comprising a recipient key and a passphrase entry, wherein the recipient key and the sender key respectively form first and second portions of a first key; and
processing, by the one or more computer processors, the activation request to automatically activate the user-loadable stored value card based on determining that the recipient key is paired with the sender key and the passphrase entry matches the sender-defined passphrase.

11. The method of claim 10, wherein the user-loadable stored value card includes a first and second part being presented to the sender, the second part being presented to the recipient.

12. The method of claim 11, wherein
the load request is transmitted by the sender directly to a financial service provider associated with the one or more processors, and
the sender is an account holder with the financial service provider.

13. The method of claim 10, wherein the activation request further comprises the amount specified in the load request.

14. The method of claim 10, wherein the user-loadable stored value card comprises a first sender part and a second recipient part, wherein the first sender part is detachable from the second recipient part, and wherein the first sender part comprises the sender key associated with the load request, and the second recipient part comprises the recipient key associated with the activation request.

15. The method of claim 10, wherein the user-loadable stored value card has no associated value before it is loaded.

16. The method of claim 10, wherein the activation request is received from a web page or mobile application.

17. The method of claim 10, wherein the load request is received from a web page or mobile application.

18. The method of claim 10, wherein the amount of money loaded on the user-loadable stored value card is revocable by the sender.

19. A system, comprising:
one or more computer processors; and
a memory in communication with the one or more processors and storing instructions that, when executed by the one or more processors, are configured to cause the system to:
receive, from a sender device associated with a sender, an activation request for a user-loadable stored value card, a passphrase defined by the sender, and an activation key associated with the activation request;
activate the user-loadable stored value card based on the activation request;
receive, via a recipient user device associated with a recipient of the user-loadable stored value card, a redemption request, the redemption request being associated with a redemption key associated with the user-loadable stored value card and the passphrase defined by the sender, wherein the redemption key and the activation key respectively form first and second portions of a first key; and process the redemption request to automatically enable funds transfer from a fund source of the sender responsive to determining that the redemption key is previously paired with the activation key.

20. The system of claim 19, wherein the memory stores further instructions that when executed by the one or more processors, are configured to cause the system to:
receive an amount to be loaded onto the user-loadable stored value card,
wherein the user-loadable stored value card is activated based on the amount to be loaded onto the user-loadable stored value card and the activation request.

* * * * *